(12) United States Patent
Kim et al.

(10) Patent No.: US 11,958,062 B2
(45) Date of Patent: Apr. 16, 2024

(54) FLOAT SORTING DEVICE FOR SELECTIVE SEPARATION OF NON-METALLIC MINERALS

(71) Applicant: KOREA ATOMIC ENERGY RESEARCH INSTITUTE, Daejeon (KR)

(72) Inventors: Bongju Kim, Gwangju (KR); Yongkwon Koh, Daejeon (KR); Jangsoon Kwon, Goyang-si (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 415 days.

(21) Appl. No.: 17/215,340

(22) Filed: Mar. 29, 2021

(65) Prior Publication Data

US 2021/0323000 A1 Oct. 21, 2021

(30) Foreign Application Priority Data

Apr. 17, 2020 (KR) .......................... 10-2020-0046863

(51) Int. Cl.
*B03D 1/006* (2006.01)
*B03D 1/01* (2006.01)
*B03D 1/24* (2006.01)

(52) U.S. Cl.
CPC ............. *B03D 1/006* (2013.01); *B03D 1/01* (2013.01); *B03D 1/242* (2013.01); *B03D 1/247* (2013.01); *B03D 2203/02* (2013.01)

(58) Field of Classification Search
CPC .......... B03D 1/006; B03D 1/01; B03D 1/242; B03D 1/247; B03D 1/02; B03D 1/028;
(Continued)

(56) References Cited

U.S. PATENT DOCUMENTS 3,244,409 A * 4/1966 Delorme ................ B01F 25/64
366/102
4,088,716 A 5/1978 Stoev et al.
(Continued)

FOREIGN PATENT DOCUMENTS

CN 1144144 A 3/1997
CN 201735451 U * 2/2011
(Continued)

OTHER PUBLICATIONS

Zhang Wei, James A. Finch 2014, Springer, Central South University Press and SpringerVerlag Berlin Heidelberg (2014) 21: 1461-1469 (Year: 2014).*
(Continued)

*Primary Examiner* — Dirk R Bass
(74) *Attorney, Agent, or Firm* — Hauptman Ham, LLP

(57) ABSTRACT

A multi-stage float sorting device includes a first flotator float-sorting ores mixed with water based on a difference in density, and a second flotator provided with a column extending in a top-down direction, one side of which communicates with the first flotator to receive primary concentrates, and float-sorts the primary concentrates based on a difference in density to obtain secondary concentrates. The second flotator includes a washing water jetting section provided at a top of the column to jet washing water, a gas sparger provided at a bottom of the column to jet an inert gas, and an opening and closing section located between the washing water jetting section and the gas sparger to partition an inside of the column into upper and lower regions, and form an opening for rising secondary concentrates in the column according to a pressure state of the lower region.

18 Claims, 7 Drawing Sheets

(58) Field of Classification Search
CPC .. B03D 1/082; B03D 1/1406; B03D 2203/02; Y02P 10/20
See application file for complete search history.

(56) References Cited

U.S. PATENT DOCUMENTS

| | | | |
|---|---|---|---|
| 4,592,834 | A | 6/1986 | Yang |
| 4,940,534 | A | 7/1990 | Harrison |
| 5,116,487 | A | 5/1992 | Parekh et al. |
| 6,024,790 | A * | 2/2000 | Allen ............... C04B 33/18 501/145 |
| 2002/0000412 | A1 | 1/2002 | Craddock et al. |
| 2015/0182973 | A1 | 7/2015 | Mankosa et al. |
| 2020/0038881 | A1 | 2/2020 | Jameson |

FOREIGN PATENT DOCUMENTS

| | | | |
|---|---|---|---|
| CN | 103480501 | A | 1/2014 |
| CN | 204275589 | U * | 4/2015 |
| CN | 104841571 | A | 8/2015 |
| CN | 206334765 | U | 7/2017 |
| CN | 108636618 | A | 10/2018 |
| CN | 209278505 | U * | 8/2019 |
| EP | 0144421 | B1 | 4/1992 |
| GB | 926172 | A | 5/1963 |
| JP | H10-156218 | A | 6/1998 |
| JP | H10156218 | A * | 6/1998 |
| JP | 2004321900 | A * | 11/2004 |
| KR | 10-0915659 | B1 | 9/2009 |
| KR | 20180056861 | A * | 5/2018 |
| KR | 10-1910431 | B1 | 10/2018 |
| KR | 10-2085914 | B1 | 3/2020 |
| WO | 98/28082 | A1 | 7/1998 |
| WO | WO-2010063475 | A2 * | 6/2010 |

OTHER PUBLICATIONS

David, Column Flotation Cell Baffles, Nov. 12, 2017, 911Metallurgist (Year: 2017).*
Fátima González Sánchez, Self-diffusion of water and its dependence on temperature and ionic strength in highly compacted montmorillonite, illite and kaolinite, 2002, Elsevier, Applied Geochemistry 23, p. 3840-3851 (Year: 2008).*
A. Sobhy, D. Tao, Nanobubble column flotation of fine coal particles and associated fundamentals, 2013, International Journal of Mineral Processing 124 (2013) 109-116 (Year: 2013).*
Chinese Office Action dated Aug. 25, 2022, in connection with the Chinese Patent Application No. 202110256188.6, 15 pages.
Korean Office Action dated Mar. 15, 2022, in connection with the Korean Patent Application No. 10-2020-0046863.
Extended European Search Report dated Sep. 21, 2021, for corresponding European Patent Application No. 21161343.5.
SM Mining & SM Resource Net, "Float beneficiation and specific gravity beneficiation and powder", New 2019 Universal Plant Column Flotation, Jan. 23, 2019, 16 pages, with English translation, cited in NPL 2.
Korean Prior Art Search Report dated Feb. 24, 2020 in connection with the corresponding Korean Patent Application No. KR10-2020-0046863.

* cited by examiner

FLOAT SORTING DEVICE FOR SELECTIVE SEPARATION OF NON-METALLIC MINERALS

CROSS-REFERENCE TO RELATED APPLICATIONS

Pursuant to 35 U.S.C. § 119(a), this application claims the benefit of an earlier filing date of and the right of priority to Korean Patent Application No. 10-2020-0046863, filed Apr. 17, 2020, the contents of which are incorporated by reference herein in its entirety.

BACKGROUND

1. Technical Field

The present disclosure relates to a float sorting device for separating impurity minerals from ores to sort concentrates.

2. Description of the Related Art

When mining minerals, many impurity minerals are contained in the minerals in addition to useful minerals. Herein, useful minerals are minerals of high quality obtained by float-sorting minerals, and in most cases, refer to ores with high quality that can be directly used as smelting raw materials or industrial raw materials.

As described above, in order to obtain useful minerals, a process of separating impurity minerals from minerals is required. In other words, in order to use useful minerals for purposes such as industrial raw materials, a process of obtaining useful minerals from minerals is required.

At this time, a float sorting method is mainly used as a method of obtaining useful minerals from ores. Here, the ores refer to minerals as they are mined. When the ores are made into fine particles, and then water is mixed to make them into pulp, and then air is blown mechanically into a float sorting device to generate bubbles, useful minerals attach to surfaces of bubbles and rise, and here, the float sorting method refers to a method of collecting useful minerals attached around the bubbles to obtain concentrates. Here, the pulp refers to a solution in which water and ores are mixed.

In general, a column flotator, which is one of float sorting devices, is mainly used to obtain concentrates from ores. The column flotator has a cylindrical structure and is configured to extend in a length direction. Due to the shape of a column flotator, the residence time of pulp in the column flotator may increase, thereby facilitating the classification of concentrates due to differences in density. For this reason, the column flotator is mainly used in various processes for float-sorting ores.

On the other hand, as shown in the related art (Korean Registered Patent Publication No. 10-1910431), a gas sparger is provided inside the column flotator.

The gas sparger is a device that jets gas into a specific container, and is mainly used for agitation of liquid and for the purpose of mass transfer or chemical reaction between gas and liquid.

The gas sparger serves to generate an upward flow of pulp inside the column flotator, and is disposed at a bottom of the column flotator to form a wake inside a washing water jetting section and the column flotator disposed at one side of the top thereof. In order to form an efficient wake inside the column flotator, the gas sparger is generally provided at a bottom of the column flotator to be biased to an inner circumferential surface of the column.

Bubbles jetted through the gas sparger rise in a length direction of the column to form an upward flow of pulp. In the related art, the gas sparger is provided to be biased to an inner circumferential surface of the column, and thus bubbles generated in the gas sparger rise together with concentrates along an inner circumferential surface of the column. In this process, there was a problem that concentrates were adsorbed to an inner circumferential surface of the column.

Furthermore, a column flotator in the related art did not have an opening and closing section provided inside the column. For this reason, there was no opening and closing section for controlling the velocity of a wake, and pulp could flow to a top of the column only through a wake generated by an upward flow by the gas sparger and a downward flow by the washing water jetting section. In addition, due to the absence of the opening and closing section, there was a problem that it was difficult to raise concentrates to a layer for recovering the concentrates at a top of the column by only a wake formed by the gas sparger and the washing water jetting section due to a length of the column.

Moreover, in the related art, the gas sparger only jetted compressed air into the column to generate bubbles in the column. When only compressed air is injected into the column, bubbles larger than a bubble size required to float low-density concentrates are generated. Due to this, there was a problem that impurity minerals that should not be floated were floated together with bubbles, and thus the purity of the obtained concentrates was lowered.

Accordingly, there is a need for a study on a multi-stage float sorting device capable of obtaining high-purity concentrates by repeatedly performing a float sorting process through a plurality of flotators.

SUMMARY

A first aspect of the present disclosure is to provide a structure of a multi-stage float sorting device in which a flotator having a column shape is disposed to perform an additional float sorting process, thereby improving the purity of finally obtained concentrates.

A second aspect of the present disclosure is to provide a structure of a multi-stage float sorting device in which concentrates can be floated to a top of the column by a pressure formed at a bottom of the column flotator.

A third aspect of the present disclosure is to provide a structure of a multi-stage float sorting device disallowing concentrates to be adsorbed to an inner circumferential surface of the column by an upward flow of pulp generated by a gas sparger inside the column.

A fourth aspect of the present disclosure is to provide a structure of a multi-stage float sorting device in which a size of bubbles jetted by a gas sparger can be raised to a top of the column.

A fifth aspect of the present disclosure is to provide a structure of a multi-stage floating sorting device capable of obtaining highly useful concentrates by placing a cation activation device in the multi-stage floating sorting device.

A multi-stage float sorting device having a configuration for achieving the foregoing objectives of the present disclosure may include a first flotator float-sorting ores mixed with water based on a difference in density; and a second flotator provided with a column extending in a top-down direction, one side of which communicates with the first flotator to receive primary concentrates, and float-sorts the primary concentrates based on a difference in density to obtain secondary concentrates, wherein the second flotator includes a washing water jetting section provided at a top of the column to jet washing water so as to separate impurity minerals from the primary concentrates; a gas sparger provided at a bottom of the column to jet an inert gas so as to generate bubbles; and an opening and closing section located between the washing water jetting section and the gas sparger to partition an inside of the column into upper and lower regions, and form an opening so as to allow secondary concentrates accommodated in the column to rise when the pressure of the lower region exceeds a set value as the inert gas is supplied.

According to an embodiment of the present disclosure, the opening and closing section may include a first opening and closing section divided into a first region formed at the top of the column and a second region formed at the bottom of the column, and a second opening and closing section divided into a third region formed at a top of the second region and a fourth region formed at a bottom of the second region.

According to another embodiment of the present disclosure, the second opening and closing section may close the second region to increase the pressure as the inert gas is supplied to the first region.

According to still another embodiment of the present disclosure, the second opening and closing section may form an opening to allow the secondary concentrates to rise to the top of the first region by the increased pressure.

According to yet still another embodiment of the present disclosure, the multi-stage float sorting device may further include a first control section provided at one side of the first opening and closing section to measure a pressure formed in the fourth region so as to form an opening of the first opening and closing section.

Here, the multi-stage float sorting device may further include a second control section provided at one side of the second opening and closing section to measure a pressure of the third region so as to open the second opening and closing section.

Furthermore, the multi-stage float sorting device may further include a circular moving body elevating and descending along an outer circumferential surface of the column, wherein the circular moving body is provided with a sensing section to view an inside of the column so as to measure a size of bubbles formed inside the column, and moves to a portion where the secondary concentrates are floated to form a layer in the column so as to discharge the secondary concentrates from the column.

According to an embodiment, the washing water jetting section may be provided to communicate with an inside of the column so as to jet washing water toward the inside of the column.

Here, the bubbles formed in the gas sparger may collide with the first opening and closing section to form a wake in the column.

Furthermore, the gas sparger may be provided at a center portion of the bottom inside the column to inject gas so as to allow the primary concentrates mixed with water to circulate outward from the center of the second region.

Furthermore, the gas sparger may supply the inert gas and compressed air in an upper direction inside the column.

Furthermore, the inert gas and the compressed air may be injected together at set time intervals to form nano-sized bubbles.

Furthermore, the inert gas may contain nitrogen gas.

Here, the multi-stage float sorting device may further include an injection device disposed at one side of the first flotator to inject a compound into the first flotator, wherein the injection device absorbs cations in the compound between a layered structure of non-metallic minerals to electrically neutralize negative charges generated by isomorphic substitution between the layered structure.

Furthermore, the multi-stage float sorting device may further include an agitation device for mixing the non-metallic minerals and the compound in the first flotator.

Furthermore, the multi-stage float sorting device may further include a first heating section provided at an outside of the bottom of the first flotator to allow the non-metallic minerals to absorb the cations in the compound of the first flotator.

Furthermore, the compound added to the injection device may be sodium hydrogen carbonate ($NaHCO_3$).

Furthermore, the multi-stage float sorting device may further include a filter press section for drying the activated secondary concentrates, wherein the filter press section is provided with a second heating section at the bottom thereof.

Furthermore, the mass of the sodium hydrogen carbonate ($NaHCO_3$) injected into the first flotator may be 5% of the mass of the ores.

DETAILED DESCRIPTION OF THE EMBODIMENTS

Figure 1:
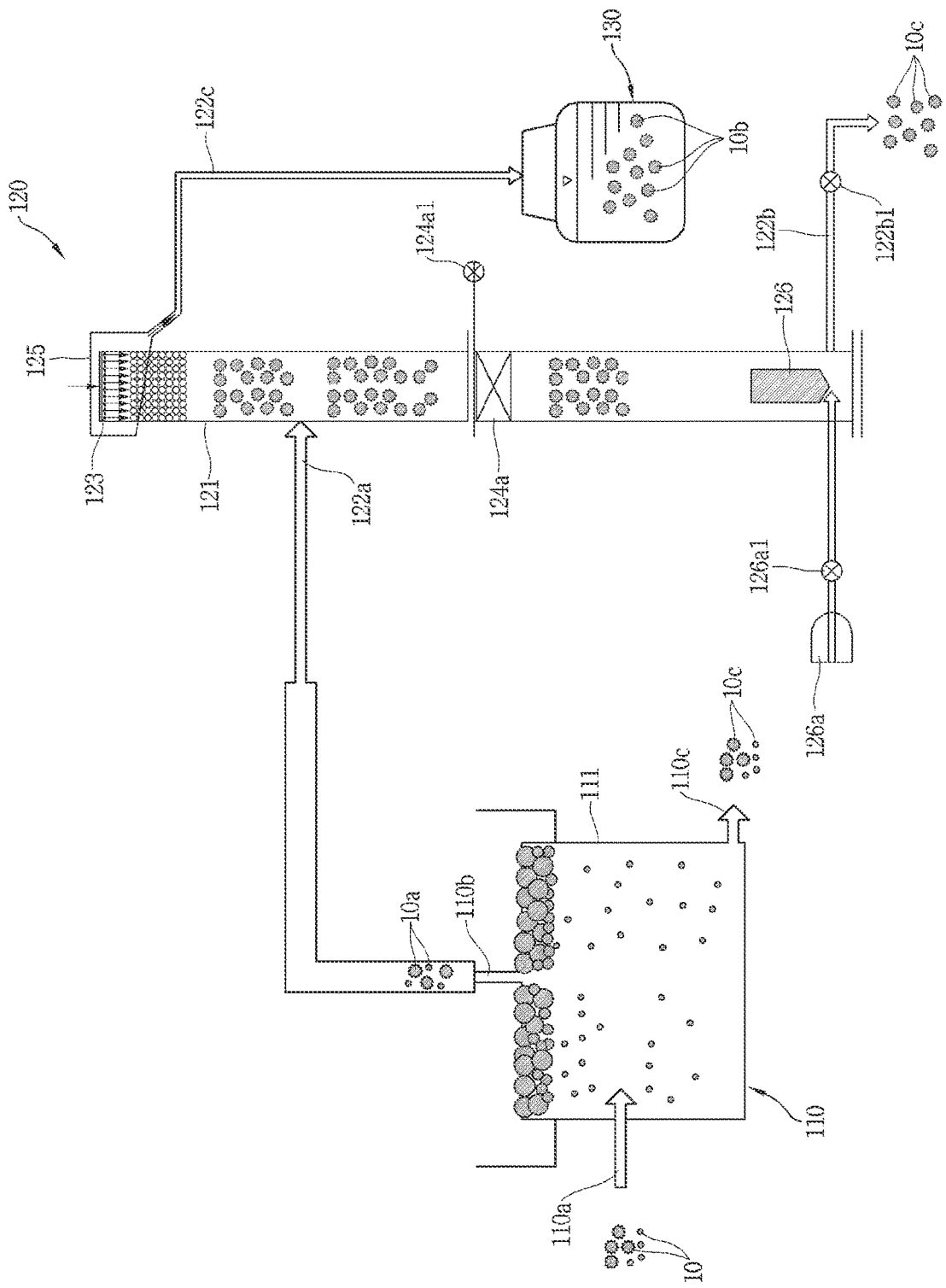
FIG. 1 is a conceptual view showing a multi-stage float sorting device.

Hereinafter, a multi-stage float sorting device for selective separation of non-metallic minerals according to the present disclosure will be described in more detail with reference to the drawings. Even in different embodiments according to the present disclosure, the same or similar reference numerals are designated to the same or similar configurations, and the description thereof will be substituted by the earlier description. A singular representation used herein may include a plural representation unless it represents a definitely different meaning from the context.

A suffix "module" and "unit" used for constituent elements disclosed in the following description is merely intended for easy description of the specification, and the suffix itself does not give any special meaning or function.

In describing the present disclosure, if a detailed explanation for a related known function or construction is considered to unnecessarily divert the gist of the present disclosure, such explanation has been omitted but would be understood by those skilled in the art. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

It will be understood that although the terms first, second, etc. may be used herein to describe various elements, these elements should not be limited by these terms. The terms are used merely for the purpose to distinguish an element from the other element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Incidentally, unless clearly used otherwise, expressions in the singular number include a plural meaning.

Terms "include" or "has" used herein should be understood that they are intended to indicate an existence of several components or several steps, disclosed in the specification, and it may also be understood that part of the components or steps may not be included or additional components or steps may further be included.

FIG. 1 is a conceptual view showing a multi-stage float sorting device 100.

The multi-stage float sorting device 100 includes a first flotator 110 and a second flotator 120. According to such an embodiment of the present disclosure, a plurality of float sorting devices may be provided to perform the process of sorting ores 10 a plurality number of times, thereby increasing the purity of useful minerals obtained in the process of float-sorting and separating the ores 10.

The first flotator 110 includes a main body section 111, a first input section 110a, a first discharge section 110b, and a second discharge section 110c. A top of the body section 111 may be in an open state or a closed state.

The first input section 110a may be disposed at one side of the body section 111. The first input section 110a may be disposed in a tubular shape. The first input section 110a is disposed to communicate with the body section 111. An inlet section of the first input section 110a into which pulp is placed may be disposed to protrude outward from the body section 111.

Water and ores 10 are placed into the body section 111 through the first input section 110a. Here, the ores 10 refer to minerals as they are mined. The water and the ores 10 may be placed into the body section 111 simultaneously or sequentially through the first input section 110a. Water and the ores 10 are placed into the first flotator 110 to form pulp.

When the pulp is placed into the body section 111 and time elapses, the impurity minerals having a high density sinks to a bottom of the body section 111. Useful minerals having a small density in the pulp are floated to a top of the body section 111.

In the process of separating useful minerals and impurity minerals due to a difference in density within the first flotator 110, a collision phenomenon between the impurity minerals and the useful minerals may occur. As a result, the impurity minerals having a high density may not sink to a bottom of the first flotator 110 and may float to a top of the first flotator 110 together with the useful minerals.

The minerals floating to the top of the first flotator 110 are referred to as primary concentrates 10a. The impurity minerals floating to the top of the first flotator 110 denote that the primary concentrates 10a and the impurity minerals may not be completely separated in the first flotator 110. In other words, herein, the primary concentrates 10a denote that useful minerals and the impurity minerals are mixed.

The floated primary concentrates 10a are discharged through the first discharge section 110b. The first discharge section 110b communicates with the second flotator 120 to supply the primary concentrates 10a to the second flotator 120.

The second discharge section 110c is disposed at one lower side of the body section 111. The second discharge section 110c is preferably disposed at a lower end portion of the body section 111 in order to discharge impurity minerals having a high density. The impurity minerals sunk to the bottom of the first flotator 110 are discharged through the second discharge section 110c. The impurity minerals discharged through the second discharge section 110c are defined as tailings 10c. Here, the tailings 10c refers to ores that are discarded during the operation of sorting and separating the ores 10.

The second flotator 120 performs a process of receiving the primary concentrates 10a from the first flotator 110 and sorting the secondary concentrates 10b from the primary concentrates 10a based on a difference in density. In other words, the secondary concentrates 10b here refer to ores obtained by separating the impurity minerals from the primary concentrates 10a.

The second flotator 120 includes a column 121, a washing water jetting section 123, a gas sparger 126, a circular moving body 125, a second input section 122a, a third discharge section 122b, a fourth discharge section 122c, and a first opening and closing section 124a.

The second flotator 120 receives water and the primary concentrates 10a through the second input section 122a. The received water and primary concentrates 10a are filled in the column 121. Then, the first opening and closing section 124a is closed by the first control section 124a1 to partition the column 121 into upper and lower regions.

The gas sparger 126 for jetting compressed air is disposed in the lower region. The gas sparger 126 jets air bubbles into the closed lower region. The pressure of the lower region is increased by air bubbles jetted through the gas sparger 126.

When the pressure of the lower region is increased to reach a preset pressure value, the first opening and closing section 124a is opened by the first control section 124a1. When the opening of the first opening and closing section 124a is carried out, the primary concentrates 10a at the bottom of the column 121 may rise to the top of the column 121 by a pressure formed in the lower region.

The washing water jetting section 123 is disposed at the top of the column 121 to jet water to the bottom of the column 121. The water jetted by the washing water jetting section 123 serves to separate impurity minerals from the primary concentrates 10a rising to the top of the column 121. Here, minerals in which the impurity mineral are separated from the primary concentrates 10a are referred to as secondary concentrates 10b.

In other words, the secondary concentrates 10b float to the top of the column 121 to form a layer that can be recovered to the outside of the column 121. The secondary concentrates 10b floating in the primary concentrates are discharged to the outside of the column 121 by the circular moving body 125. The fourth discharge section 122c communicated with the circular moving body 125 supplies the secondary concentrates 10b to the vault 130 to be stored.

Figure 2:
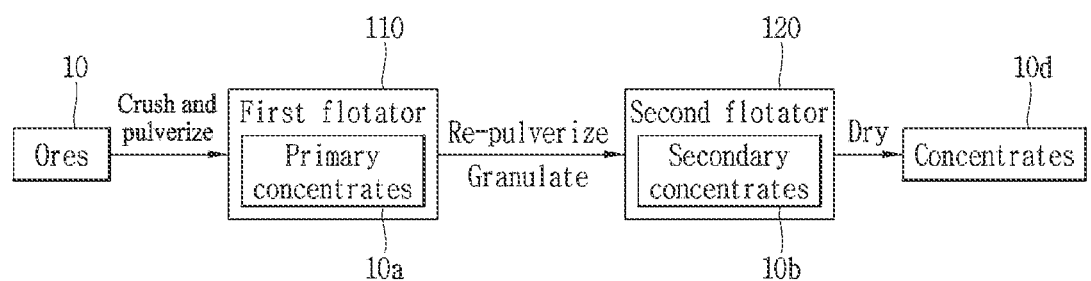
FIG. 2 is a flowchart showing a series of processes in which secondary concentrates are float-sorted from ores.

FIG. 2 is a flowchart showing a series of processes in which the secondary concentrates 10b are float-sorted from the ores 10.

First, a crushing and pulverizing process is required in order for the original ores 10 to be placed into the first flotator 110. Here, crushing and pulverizing refers to a process in which the ores 10 are crushed finely as necessary. The crushing and pulverizing process is divided into crushing in which the ores 10 are crushed to a size of gravel and pulverizing in which the gravel is pulverized again into sand or powder.

The ores 10 that have undergone the crushing and pulverizing process are placed into the first flotator 110 together with water to undergo a float sorting process. The first flotator 110 primarily performs an operation of separating impurity minerals having a large particle size from useful minerals by a difference in density. The primary concentrates 10a recovered from the first flotator 110 may be in a state in which a lot of impurity minerals as well as useful minerals are mixed.

Due to the ores 10 that are not sufficiently pulverized, the impurity minerals may not be completely separated during the float sorting process of the first flotator 110. In this case, the ores 10 may undergo a re-pulverizing process again.

In order to perform a secondary sorting operation of the primary concentrates 10a recovered from the first flotator 110, the primary concentrates 10a may be placed into the second flotator 120. In addition, the ores that have undergone the re-pulverizing process may also be placed into the second flotator 120.

A process of float-sorting the secondary concentrates 10b from the primary concentrates 10a is performed by the second flotator 120. In other words, impurity minerals that have not been sorted by the first flotator 110 may be separated through a float sorting process in the second flotator 120.

As described above, a plurality of flotators may be provided to achieve the high purity of the finally obtained secondary concentrates 10b.

The recovered secondary concentrates 10b are in a liquid state and must undergo a drying process in order to be used for their original purpose. Subsequent to having undergone the drying process, the concentrates 10d may be obtained.

Figure 3:
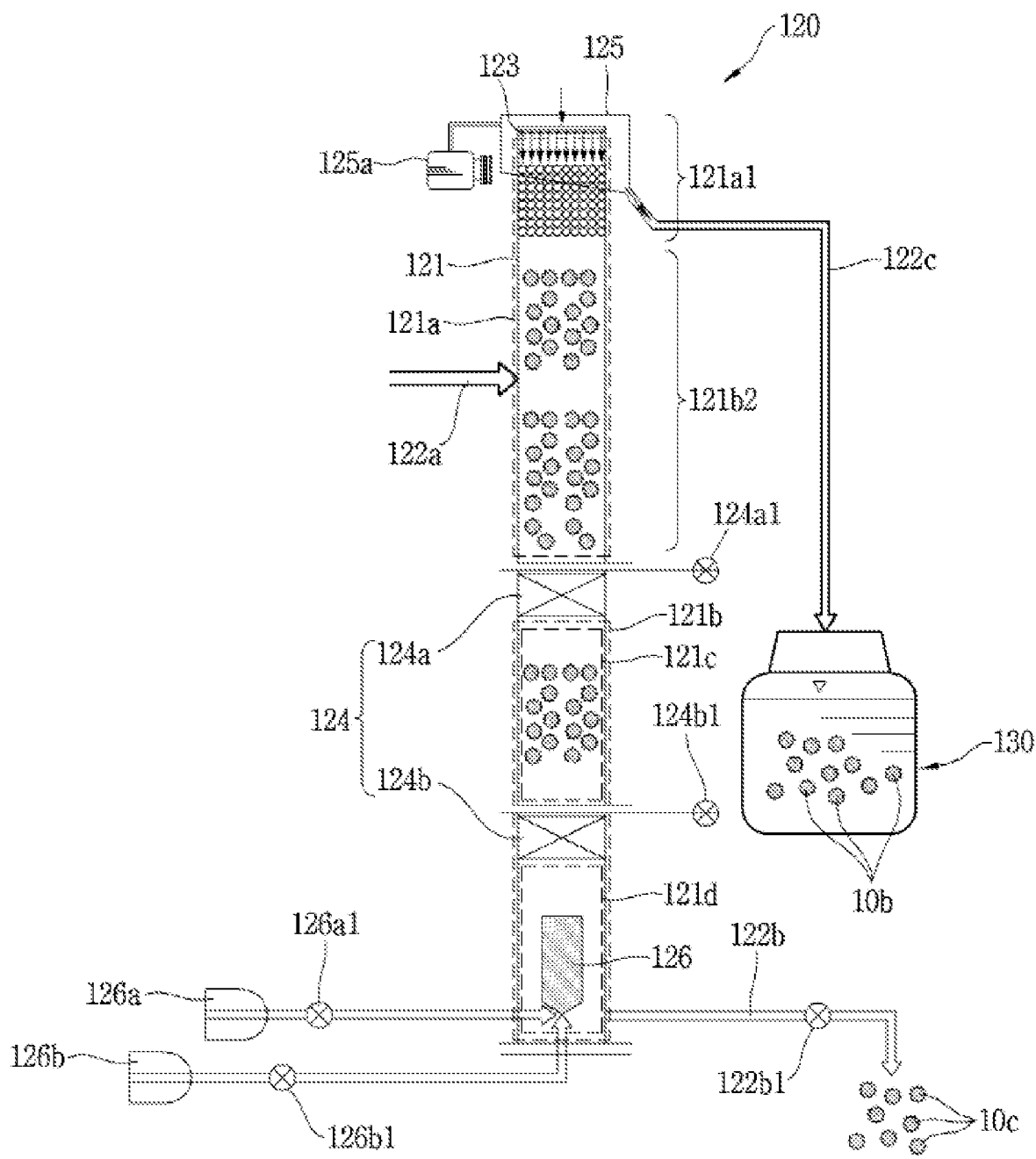
FIG. 3 is a conceptual view showing a second flotator.

FIG. 3 is a conceptual view showing the second flotator 120, which is a component of the multi-stage float sorting device 100.

A process in which the secondary concentrates 10b are float-sorted in the second flotator 120 will be described in detail.

The second flotator 120 includes a column 121, a washing water jetting section 123, a gas sparger 126, a circular moving body 125, a second input section 122a, a third discharge section 122b, and a vault 130, and a fourth discharge section 122c, and an opening and closing section 124.

The second flotator 120 may be disposed in a cylindrical shape. For example, the second flotator 120 may disposed in the form of a column 121 extending in a top-down direction.

The column 121 has an opening and closing section 124 that partitions an inner region. The opening and closing section 124 is divided into a first opening and closing section 124a and a second opening and closing section 124b.

The first opening and closing section 124a may be located at the center of the column 121 extending in a length direction. Inside the column 121, a first region 121a is disposed at an upper portion, and a second region 121b at a lower portion with respect to the first opening and closing section 124a. The inside of the column 121 is preferably partitioned by the first opening and closing section 124a such that the first region 121a and the second region 121b have the same volume.

The second opening and closing section 124b may be disposed at a lower position than the first opening and closing section 124a. For the second region 121b, a third region 121c is disposed at an upper portion, and a fourth region 121d disposed at a lower portion with respect to the second opening and closing section 124b. The second region 121b is preferably partitioned by the second opening and closing section 124b such that the third region 121c and the fourth region 121d have the same volume.

The second input section 122a is configured to communicate with the first discharge section 110b of the first flotator 110. The second input section 122a is disposed at one side of the column 121 to receive the water and the primary concentrates 10a from the first flotator 110.

The water and the primary concentrates 10a may be fully filled in the column 121. After the column 121 is fully filled with water and the primary concentrates 10a, a time may be required for separating the secondary concentrates 10b and the impurity minerals due to a difference in density.

After the primary concentrates 10a and the water are fully filled in the column 121, the configurations of the first opening and closing section 124a and the second opening and closing section 124b are closed. Here, the configuration of the opening and closing section 124 bring closed denotes that an inside of the column 121 is isolated into a specific region. In other words, it may denote that a specific region is closed such that one space inside the column 121 forms a closed region. The first opening and closing section 124a and the second opening and closing section 124b, which are a component of the opening and closing section 124, may be closed simultaneously or sequentially.

A first control section 124a1 is provided at one side of the first opening and closing section 124a, and a second control section 124b1 is provided at one side of the second opening and closing section 124b. The first control section 124a1 serves to control the first opening and closing section 124a to open and close the first opening and closing section 124a. The second control section 124b1 serves to control the second opening and closing section 124b to open and close the second opening and closing section 124b.

The opening and closing section 124 may be disposed to prevent the leakage of the primary concentrates 10a and the water when partitioning the column 121 into a plurality of spaces. For example, one side surface of the opening and closing section 124 and an inner circumferential surface of the column 121 may be configured to be in close contact with each other to seal the space.

After the inside of the column 121 is partitioned by the opening and closing section 124, gas may be supplied through the gas sparger 126. The gas sparger 126 may be disposed at the bottom of the column 121. For example, the gas sparger 126 may be disposed inside the fourth region 121d. Gas jetted through the gas sparger 126 may increase the pressure inside the closed fourth region 121d. Since water is an incompressible fluid, when gas is supplied to the closed space, the pressure of the closed fourth region 121d may increase.

When the pressure of the fourth region 121d reaches a set pressure value, the second control section 124b1 opens the second opening and closing section 124b. When the second opening and closing section 124b is opened, the secondary concentrates 10b and bubbles in the fourth region 121d rise to the third region 121c. In this process, the rise of impure minerals may also occur.

After the secondary concentrates 10b and bubbles rise to the third region 121c, the second opening and closing section 124b is closed by the second control section 124b1. As the second opening and closing section 124b is closed, the second region 121b is further partitioned into the third region 121c and the fourth region 121d. The pressure of the third region 121c is increased due to the secondary concentrates 10b and bubbles raised in the fourth region 121d. The second opening and closing section 124b is preferably closed while the pressure of the third region 121c is increased.

After the second opening and closing section 124b is closed, gas is again jetted into the fourth region 121d through the gas sparger 126. The gas jetted through the gas sparger 126 increases the pressure inside the closed fourth region 121d. Again, when the pressure of the fourth region 121d reaches a set pressure value, the second control section opens the second opening and closing section 124b.

When the second opening and closing section 124b is opened, the pressure of liquid rising in the fourth region 121d may be added to the pressure previously formed in the third region 121c. When pressure is added to the inside of the fourth region 121d and the pressure of the third region 121c reaches a set pressure value, the first opening and closing section 124a is opened by the first control section 124a1. Here, the set pressure value denotes a pressure at which the secondary concentrates 10b and bubbles inside the third region 121c can float to the top of the column 121.

As described above, the first opening and closing section 124a and the second opening and closing section 124b may be provided to sequentially increase the pressure inside the third region 121c and the fourth region 121d, thereby allowing bubbles to float up to the top of the column 121 together with the secondary concentrates 10b. In addition, a plurality of opening and closing sections in the column 121 may be provided to gradually increase the pressure, thereby preventing parts from being damaged due to a steep pressure increase.

After the first opening and closing section 124a is opened, the rising bubbles may float to the top of the column 121 together with the secondary concentrates 10b. In other words, the secondary concentrates 10b may float to the top of the first region 121a. The secondary concentrates 10b floating to the top of the column 121 forms a collection zone 121a1 inside the column 121. Here, the collection zone 121a1 refers to a layer in which only the secondary concentrates 10b in the recovery step is discharged during the float sorting process.

A cleaning zone 121a2 may be formed between a lower boundary of the collection zone 121a1 and the first opening and closing section 124a. Here, the cleaning zone 121a2 refers to a layer in which an operation of washing concentrates in the recovery step is carried out during the float sorting process. An operation of separating impurity minerals attached to the rising secondary concentrates 10b is performed in the cleaning zone 121a2.

The circular moving body 125 is provided on an outer peripheral surface of the column 121. The circular moving body 125 is configured to elevate and descend along an outer circumferential surface of the column 121. A sensing section 125a capable of seeing through an inside of the column 121 is provided at one side of the circular moving body 125. The sensing section 125a may check a size of bubbles rising inside the column 121. Here, the sensing 125a may be composed of an ultra-high speed camera to capture the size of bubbles rapidly rising.

In order to increase the purity of the secondary concentrates 10b obtained in the column 121, the size of the bubbles is preferably a nano size. The sensing section 125a checks the height at which the nano-sized bubbles are formed to enable precise separation of the secondary concentrates 10b. Then, the circular moving body 125 moves to a portion where the nano-sized bubbles are formed to recover the secondary concentrates 10b. The secondary concentrates 10b discharged from the circular moving body 125 are discharged through the fourth discharge section 122c.

The vault 130 may be configured to communicate with the fourth discharge section 122c. The secondary concentrates 10b discharged through the fourth discharge section 122c is stored in the vault 130. The secondary concentrates 10b are in a liquid state and must be passed through a drying device (not shown) or the like for later use.

Figure 4:
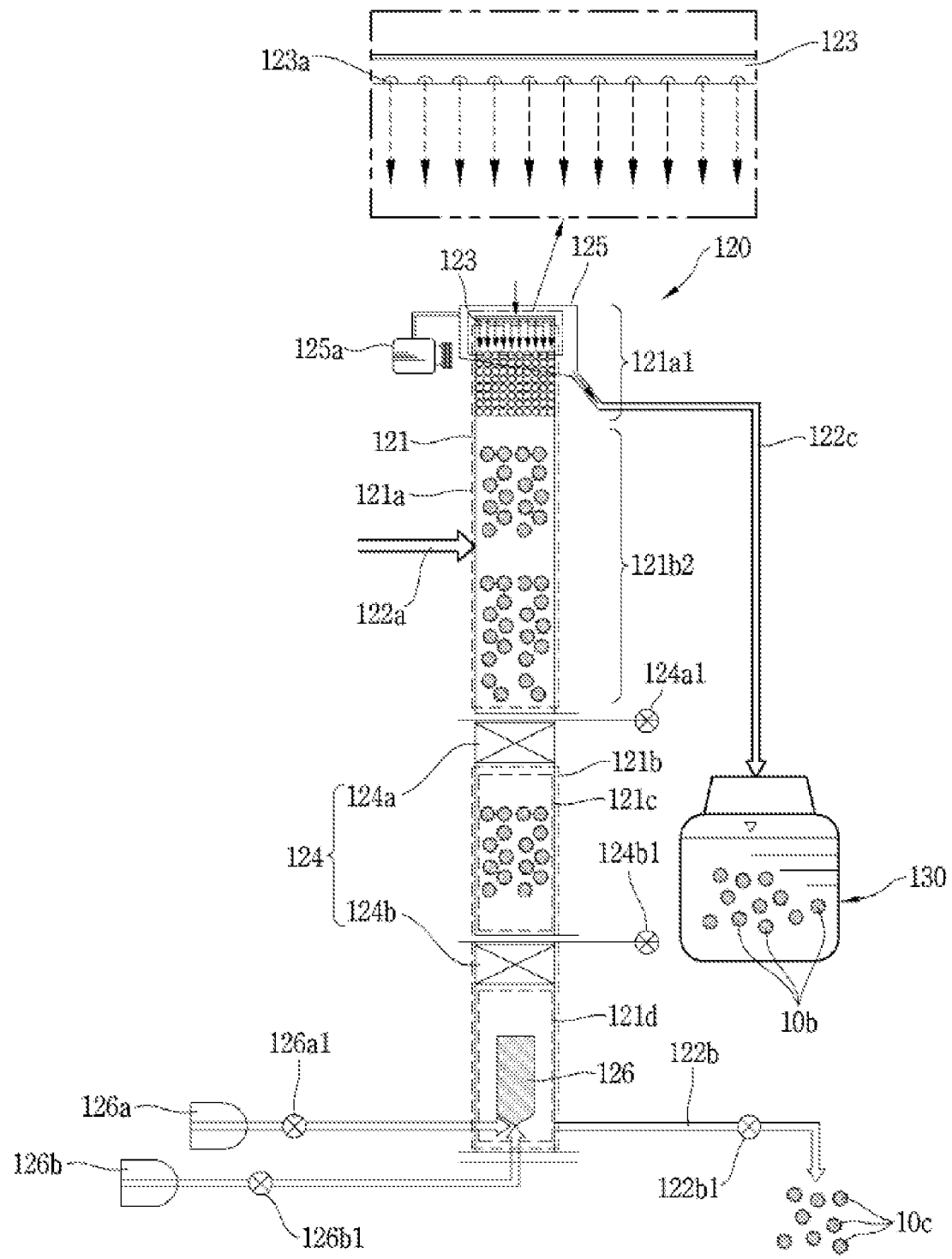
FIG. 4 is a conceptual view showing a washing water jetting section.

FIG. 4 is a view showing a washing water jetting section 123, which is a component of the first flotator 110.

The washing water jetting section 123 is configured to jet washing water to the bottom of the column 121. The washing water jetting section 123 may be disposed at the top inside the column 121. In other words, the washing water jetting section 123 may be configured to communicate with an inner side of the column 121.

The washing water jetting section 123 may be disposed to protrude in an inward direction of the column 121. A supply section (not shown) that receives water through a portion in communication with the inner side of the column 121 may be provided.

For another example of the washing water jetting section 123, the second flotator 120 may be configured separately, and located inside the second flotator 120. In other words, a separate tube may be disposed to communicate with the washing water jetting section 123.

The washing water jetting section 123 may have a wide circular plate shape to have a jetting section hole 123a through which water is supplied to a bottom thereof. In order to evenly jet washing water into the column 121, the shape of the washing water jetting section 123 is preferably matched to that of an inner surface of the column 121. The number of the jetting section holes 123a arranged in the washing water jetting section 123 may be controlled according to the jetting amount and intensity of water.

The washing water jetting section 123 is formed in the form of jetting water into the column 121 to separate the impurity minerals from the secondary concentrates 10b floating to the top of the column 121. In order to allow the rising impurity minerals to move downward to the bottom of the column 121, a direction of jetting water from the washing water jetting section 123 is preferably a downward direction of the column 121.

Figure 5:
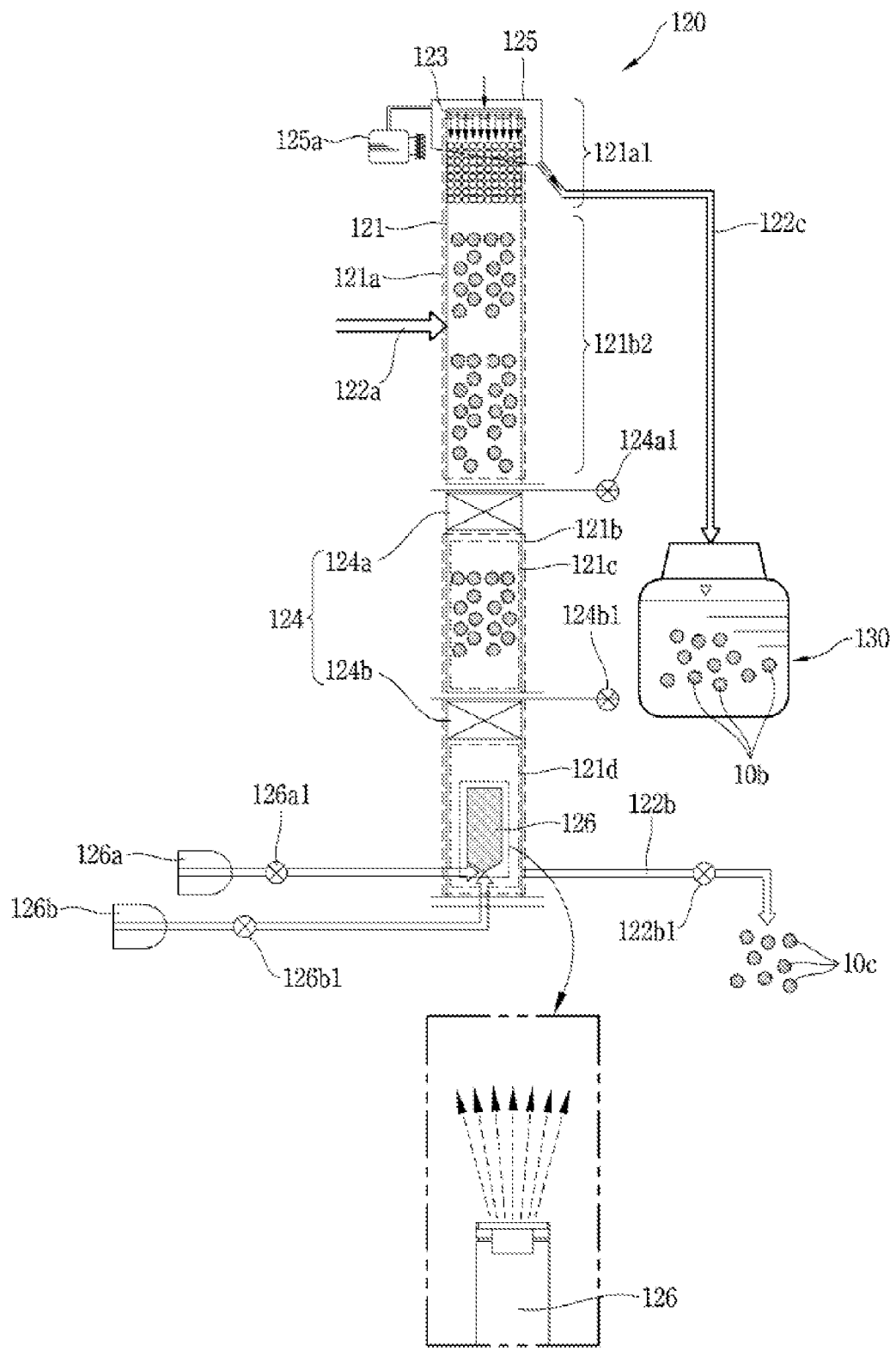
FIG. 5 is a conceptual view showing a gas sparger.

FIG. 5 is a view showing the gas sparger 126, which is a component of the second flotator 120.

The gas sparger 126 may be disposed in the form of a tube or plate for blowing gas into a culture tank or the like. For example, there are various methods such as a single hole nozzle method of blowing gas into a tube with an open end, or a method of opening a hole in a horizontal tube, a cross-shaped or an annular tube to blow gas thereinto.

The gas sparger 126 in a shape that allows appropriate agitation of water inside the column 121 and the primary concentrates 10a may be preferably selected.

The gas sparger 126 may be provided with a first gas supply section 126a for jetting compressed air into the column 121. The first gas supply section 126*a* and the gas sparger 126 are communicated with each other through a tube. A first gas control section 126*a*1 may be provided in a tube communicating from the first gas supply section 126*a* to the gas sparger 126. The first gas control section 126*a*1 may control a time and an amount of compressed air jetted through the gas sparger 126.

The gas sparger 126 may be provided with a second gas supply section 126*b* for jetting an inert gas into the column 121. The second gas supply section 126*b* and the gas sparger 126 are communicated with each other through a tube. A second gas control section 126*b*1 may be provided in a tube connecting from the second gas supply section 126*b* to the gas sparger 126. The second gas control section 126*b*1 may control a time and amount of the inert gas jetted through the gas sparger 126.

The compressed air and the inert gas may be jetted simultaneously or sequentially through the gas sparger 126. The jetted compressed air and inert gas generate the bubbles into the column 121. Collisions between the compressed air jetted into the column 121 and the bubbles generated by the inert gas may occur.

The inert gas supplied through the second gas supply section 126*b* may be nitrogen ($N_2$), oxygen ($O_2$), helium (He), and argon (Ar) gas.

In order for the bubbles to rise to the top of the column 121, bubbles with a fine size must be formed. Here, the fine size means nano-sized bubbles. Bubbles smaller than the previously jetted bubbles may be formed due to collisions between the compressed air and bubbles generated by the inert gas. In order to form the nano-sized bubbles, the inert gas supplied through the second gas supply section 126*b* is preferably nitrogen ($N_2$). Furthermore, for safety reasons, nitrogen ($N_2$) is preferably selected as the inert gas.

In addition, the first gas supply section 126*a* and the second gas supply section 126*b* may jet gas into the column 121 together at set time intervals to form fine bubbles. When gas is injected through the first gas supply section 126*a* and the second gas supply section 126*b*, bubbles are formed in the column 121.

The injection of gas is stopped when a predetermined amount of bubbles is formed, and then the gas sparger 126 again jets the gas into the column 121 to generate bubbles when a set time elapses. The previously formed bubbles collide with newly generated bubbles. Compared to the gas sparger 126 continuously injecting gas, when gas is jetted at set time intervals, collisions between bubbles may occur actively. Therefore, it becomes easier to form fine-sized bubbles.

The gas sparger 126 is provided at the bottom inside the column 121 to jet gas such that the primary concentrates 10*a* mixed with water circulates in the fourth region 121*d*. When the gas sparger 126 is provided to be biased to an inner surface of the column 121, bubbles jetted by the gas sparger 126 rise along an inner wall surface of the column 121. Accordingly, the secondary concentrates 10*b* also rise along the inner wall surface of the column 121 with the bubbles. In this process, friction may occur between the inner wall surface of the column 121 and the secondary concentrates 10*b*. As a result, the secondary concentrates 10*b* may be attached to the inner wall surface of the column 121. For example, it denotes that the secondary concentrates 10*b*, which are useful minerals, may be adsorbed on the inner wall surface of the column 121.

Accordingly, the gas sparger 126 is provided at the center of the bottom of the column 121 to jet the gas so as to circulate outward from the center inside the fourth region 121*d*. Therefore, circulation in the fourth region 121*d* may start from the center of the column 121, thereby preventing the secondary concentrates 10*b* from being adsorbed to the inner surface of the column 121.

The secondary concentrates 10*b* may be prevented from being attached to an inner circumferential surface of the column 121, thereby increasing a recovery rate of the secondary concentrates 10*b* recovered to the vault 130.

Figure 6:
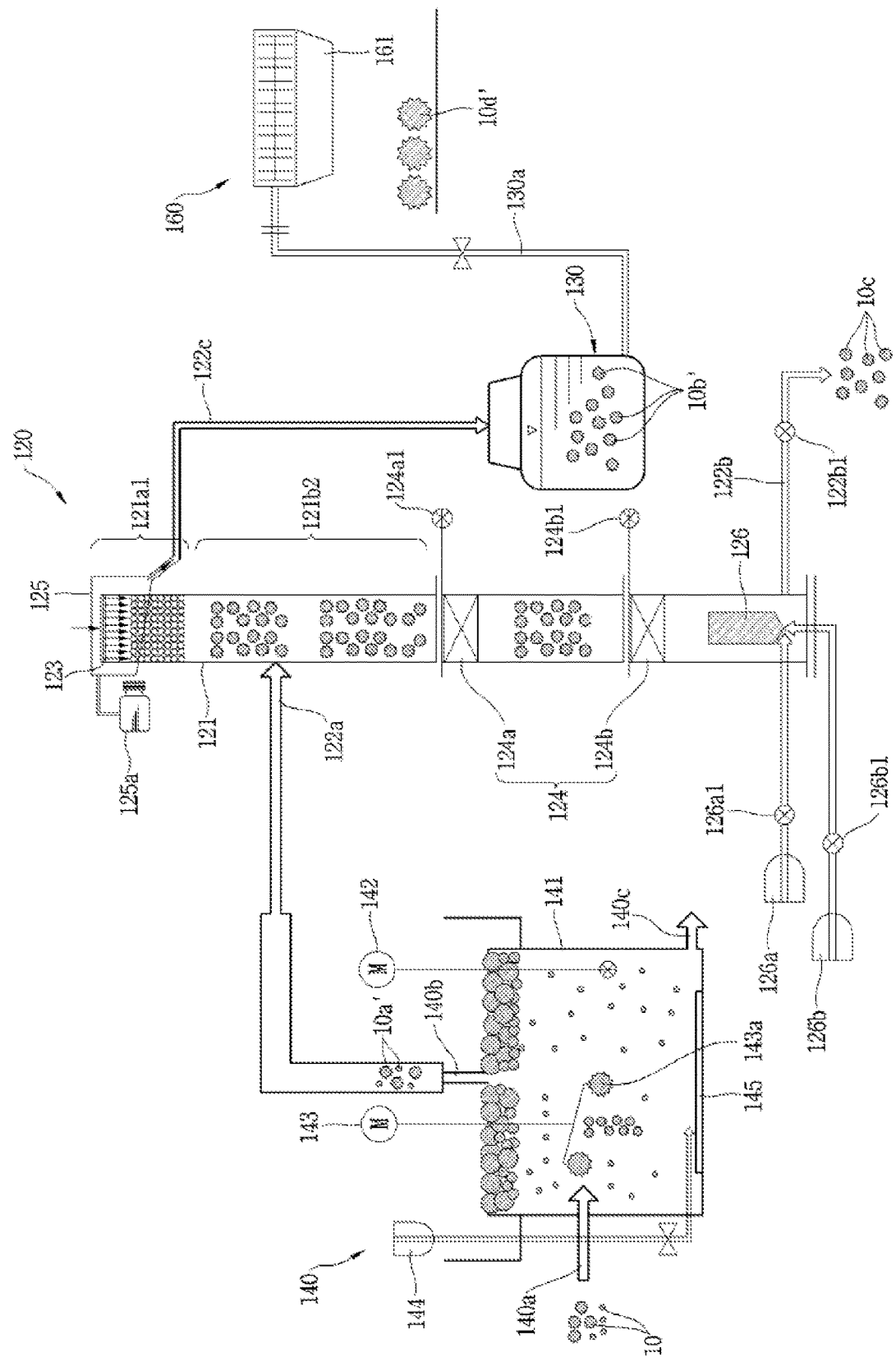
FIG. 6 is a conceptual view showing a state in which an activation device for useful minerals is additionally provided in a first flotator.

FIG. 6 is a view showing that the first flotator 110 includes an activation device for useful minerals.

The activation device may be included in the first flotator 110 or the second flotator 120. Hereinafter, a process in which the activation device is included in the first flotator 110 to undergo float sorting will be described in detail.

In the configuration of the first flotator 110 (refer to FIG. 1), the first flotator 140 including the activation device may further includes an ore input section 140*a*, a body section 141, a compound input section 142, and an agitation device 143, an air injection device 144, and a heating section 145.

As described with reference to FIG. 1, water and the ores 10 are placed into the first flotator 140 including the activation device through the ore input section 140*a*. Then, a compound for the activation of the primary concentrates 10*a* may be placed into the compound input section 142.

The agitation device 143 may be disposed on one side of the top of the first flotator 140 including the activation device. An agitator 143*a* of the agitation device 143 is disposed in the first flotator 140 including the activating device.

The agitation device 143, which is a device for mixing a liquid, may include rotating blades into a liquid, using kinetic energy of a fluid, ejecting air or the like into a liquid. The agitation device 143 may cause a substitution or ion exchange reaction between ions and cations in the primary concentrates 10*a*. The agitation device 143 that allows cations to be appropriately substituted into the primary concentrates 10*a* may be preferably selected. However, the agitation device 143 should be able to maintain an appropriate agitation speed to disallow the tailings 10*c* precipitated during the agitation process to float again.

Furthermore, the air injection device 144 may be disposed at one side of the first flotator 140 including the activation device. A gas tube communicating with the air injection device 144 may be disposed at one side of the bottom of the first flotator 140 including the activation device. In order to inject air into the first flotator 140 including the activation device to appropriately agitate pulp, it is preferable to jet air from the bottom to the top.

Similar to the agitation device 143, the air injection device 144 serves to facilitate an exchange reaction between the primary concentrates 10*a* and the cations in the pulp. However, it may be necessary to control the speed at which the injection device 144 jets air to disallow the tailings 10*c* precipitated during the agitation process to float again.

The heating section 145 is disposed at one side of the bottom of the first flotator 110 including the activation device. A temperature factor is important in the cation activation process. The heating section 145 serves to increase the temperature of an inside of the first subsidiary 140 including the activation device so as to activate the primary concentrates 10*a*. The heating section 145 preferably maintains the inside of the first flotator 140 including the activation device at 50 to 80° C. during the cation activation process.

The primary concentrates 10*a*' activated by the second flotator 120 is placed, and then the activated secondary concentrates 10b' are stored in the vault 130 through the process described above in FIG. 3.

A fifth discharge section 130a is disposed at one side of the vault 130. The fifth discharge section 130a supplies the activated secondary concentrates 10b' to a filter press section 160.

The filter press section 160 includes a heating section 161 and a plurality of screws and grills to move and dry the activated secondary concentrates 10b'. The plurality of screws and grills serve to move the secondary concentrates 10b' supplied from the vault 130 to undergo a drying process. The screws and grills are arranged inside the filter press section 160 to perform a rotation operation.

The heating section 161 is provided at a bottom of the filter press section 160 to dry the activated secondary concentrates 10b'. The activated secondary concentrates 10b' are dried in the filter press section 160 to discharge the activated concentrates 10d'. The secondary activation of the secondary concentrates 10b' activated by the temperature and pressure applied by the filter press section 160 may occur.

Figure 7:
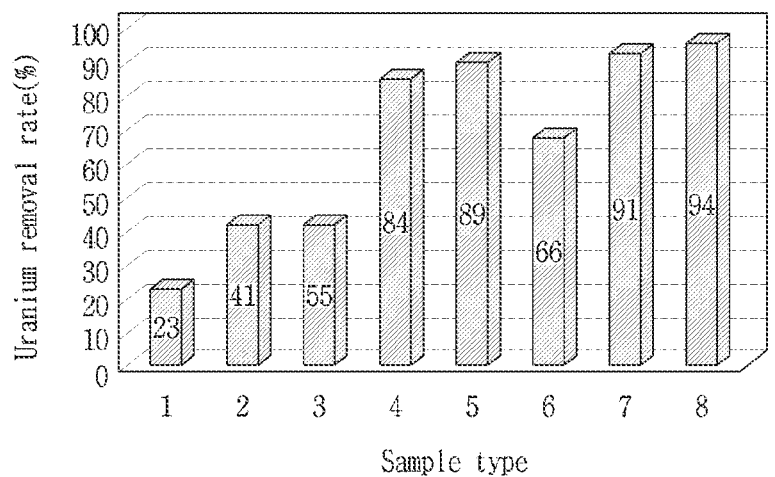
FIG. 7 is a graph showing a uranium removal rate of concentrates according to a sample placed in an activation process when activated concentrates are used as an absorbent material.

FIG. 7 is a view showing a uranium removal rate of bentonite according to a sample placed in an activation process when activated concentrates are used as an absorbent material.

The non-metallic mineral to be sorted in the present disclosure may be bentonite. Here, bentonite refers to clay mainly containing montmorillonite, which is a mineral belonging to a monoclinic system having a crystal structure such as mica. In addition, the term monoclinic system here refers to a crystal form in which three crystal axes of different lengths are formed, among which the left-right axis and the top-down axis are orthogonal, and the front-rear axis forms an oblique angle with the left-right axis.

Bentonite belongs to a smectite group containing a large amount of montmorillonite. All minerals in this group have a layered structure and swelling properties. Here, swelling refers to a phenomenon in which a substance absorbs a solvent to swell.

The layered structure is composed of a 2:1 type structure of a silica tetrahedron, two layers, and one layer of tetrahedral aluminum hydroxyl group therebetween. In order to electrically neutralize negative charges generated by isomorphic substitution in a silica tetrahedron or aluminum tetrahedron, cations are absorbed between the layers. Here, the cations may be sodium ions (Na+), magnesium ions (Mg2+), or calcium ions (Ca2+).

Montmorillonite, which is a main constituent mineral of bentonite, generates layer charges mainly by internal substitution of the aluminum tetrahedron. In this case, it is classified into Na-type bentonite and Ca-type bentonite according to the type of exchangeable cations present between layers, and swells due to interlayer hydration, resulting in volume expansion. Here, hydration refers to a phenomenon in which water molecules surround and interact with solute molecules or ions dissolved in an aqueous solution, and behave like a single molecule.

In this way, activated bentonite is widely used as a buffer material, a liner material, or an absorbent material. When bentonite is used as a buffer material, a liner material, or an absorbent material, the Na-type bentonite, which is physicochemically safe, is preferred.

The graph of FIG. 7 is a result of performing an experiment for removing uranium from activated bentonite according to a sample placed into the float sorting device. Activated bentonite may be used as a buffer material for a radioactive waste disposal site. Uranium is the material most commonly released to the radioactive waste disposal site. Accordingly, in the case where activated bentonite is used as a buffer material, an experiment was performed to remove uranium in a test container to determine the adsorption performance. When the activated bentonite is used as a buffer material, a high uranium removal rate (%) denotes that an ion exchange reaction was appropriately performed during the activation process of the concentrates 10d (see FIG. 6).

Referring to the graph of FIG. 7, when a first sample (Ca—B) was placed to activate bentonite, the uranium removal rate (%) was found to be 23%. Here, the uranium removal rate refers to a reduction rate of uranium compared to the existing mass of uranium when bentonite activated by the first sample (Ca—B) is placed into the test container.

When a second sample (Na—B) was placed to activate bentonite, the uranium removal rate (%) was found to be 41%.

When a third sample ($Na_2CO_3$) corresponding to 1% of the ore content was placed to activate bentonite, the uranium removal rate (%) was found to be 23%.

When a fourth sample ($Na_2CO_3$) corresponding to 3% of the ore content was placed to activate bentonite, the uranium removal rate (%) was found to be 55%.

When a fifth sample ($Na_2CO_3$) corresponding to 5% of the ore content was placed to activate bentonite, the uranium removal rate (%) was found to be 84%.

When a sixth sample ($NaHCO_3$) corresponding to 1% of the ore content was placed to activate bentonite, the uranium removal rate (%) was found to be 89%.

When a seventh sample ($NaHCO_3$) corresponding to 3% of the ore content was placed to activate bentonite, the uranium removal rate (%) was found to be 91%.

When an eighth sample ($NaHCO_3$) corresponding to 5% of the ore content was placed to activate bentonite, the uranium removal rate (%) was found to be 94%.

Therefore, in order to obtain activated bentonite with improved adsorption performance, it is more advantageous to add sodium hydrogen carbonate ($NaHCO_3$) as the compound. In addition, when activated bentonite is used as the buffer material, the amount of sodium hydrogen carbonate ($NaHCO_3$) added should be 3% to 5% compared to the ore content in order to obtain a uranium removal rate of 90% or more. However, in order to maximize the adsorption performance of activated bentonite, sodium hydrogen carbonate ($NaHCO_3$) is preferably 5% of the ore content.

According to the present disclosure having the above configuration, it may be possible to increase the purity of concentrates finally obtained through a plurality of float sorting processes. In particular, it may be possible to obtain secondary concentrates with high purity by performing a process of primarily float-sorting ores in the first flotator and performing a process of secondarily float-sorting the ores in the second flotator.

Moreover, an opening and closing section may be provided inside the column of the second flotator to increase the pressure inside the bottom region by bubbles jetted through the gas sparger. Through this, the secondary concentrates existing in the bottom region may be floated to the top of the column.

Furthermore, the gas sparger may be provided at a lower end of the center of the second flotator, thereby allowing an upward flow of the column generated by bubbles jetted through the gas sparger to be formed at the center of the column. Accordingly, it may be possible to minimize the secondary concentrates from being absorbed to an inner circumferential surface of the column while the pulp flows in the column.

In addition, both compressed air and inert gas may be injected into the column through the gas sparger, thereby generating nano-sized bubbles by collisions between the compressed air and the inert gas. Through this, useful minerals may be precisely separated from the ores.

Moreover, a device for activating cations may be provided in the first or second flotator, thereby allowing the cations to be included in the finally obtained secondary concentrates. When the activated concentrates finally obtained through this are used as an absorbent material, the performance of adsorbing impurities may be improved.

The configurations and methods according to the above-described embodiments will not be applicable in a limited way to the foregoing multi-stage float sorting device for selective separation of non-metallic minerals described above, and all or part of each embodiment may be selectively combined and configured to make various modifications thereto.

What is claimed is:

1. A multi-stage float sorting device, comprising:
a first flotator float-sorting ores mixed with water based on a difference in density; and
a second flotator, provided with a column extending in a top-down direction, one side of which directly connected with the first flotator to receive primary concentrates, float-sorting the primary concentrates based on a difference in density to obtain secondary concentrates,
wherein the second flotator comprises:
a washing water jetting section provided at a top of the column to jet washing water so as to separate impurity minerals from the primary concentrates;
a gas sparger provided at a bottom of the column to jet an inert gas so as to generate bubbles; and
an opening and closing section located between the washing water jetting section and the gas sparger to partition an inside of the column into upper and lower regions, and form an opening so as to allow the secondary concentrates accommodated in the column to rise when the pressure of the lower region exceeds a set value as the inert gas is supplied, and
wherein the opening and closing section comprises:
a first opening and closing section provided to divide the column into a first region formed at the top of the column and a second region formed at the bottom of the column; and
a second opening and closing section provided to divide the second region into a third region formed at a top of the second region and a fourth region formed at a bottom of the second region.

2. The multi-stage float sorting device of claim 1, wherein the second opening and closing section closes the fourth region to increase the pressure as the inert gas is supplied to the fourth region.

3. The multi-stage float sorting device of claim 1, wherein the second opening and closing section forms an opening to allow the secondary concentrates to rise to the top of the first region by the increased pressure.

4. The multi-stage float sorting device of claim 1, further comprising:
a first control section provided at one side of the first opening and closing section to measure a pressure formed in the third region so as to form an opening of the first opening and closing section.

5. The multi-stage float sorting device of claim 4, further comprising:
a second control section provided at one side of the second opening and closing section to measure a pressure of the fourth region so as to open the second opening and closing section.

6. The multi-stage float sorting device of claim 1, further comprising:
a circular moving body elevating and descending along an outer circumferential surface of the column,
wherein the circular moving body is provided with a sensing section to view an inside of the column so as to measure a size of bubbles formed inside the column, and moves to a portion where the secondary concentrates are floated to form a layer in the column so as to discharge the secondary concentrates from the column.

7. The multi-stage float sorting device of claim 1, wherein the washing water jetting section is provided to communicate with an inside of the column so as to jet washing water toward the inside of the column.

8. The multi-stage float sorting device of claim 1, wherein the bubbles formed in the gas sparger collide with the first opening and closing section to form a wake in the column.

9. The multi-stage float sorting device of claim 8, wherein the gas sparger is provided at a center portion of the bottom inside the column to inject gas so as to allow the primary concentrates mixed with water to circulate outward from the center of the second region.

10. The multi-stage float sorting device of claim 9, wherein the gas sparger supplies the inert gas and compressed air in an upper direction inside the column.

11. The multi-stage float sorting device of claim 10, wherein the inert gas and the compressed air are injected together at set time intervals to form nano-sized bubbles.

12. The multi-stage float sorting device of claim 11, wherein the inert gas contains nitrogen gas.

13. The multi-stage float sorting device of claim 1, further comprising:
an injection device disposed at one side of the first flotator to inject a compound into the first flotator,
wherein the injection device absorbs cations in the compound between a layered structure of non-metallic minerals to electrically neutralize negative charges generated by isomorphic substitution between the layered structure.

14. The multi-stage float sorting device of claim 13, further comprising:
an agitation device for mixing the non-metallic minerals and the compound in the first flotator.

15. The multi-stage float sorting device of claim 13, further comprising:
a first heating section provided at an outside of the bottom of the first flotator to allow the non-metallic minerals to absorb the cations in the compound of the first flotator.

16. The multi-stage float sorting device of claim 13, wherein the compound added to the injection device is sodium hydrogen carbonate ($NaHCO_3$).

17. The multi-stage float sorting device of claim 13, further comprising:
a filter press section for drying the activated secondary concentrates,
wherein the filter press section is provided with a second heating section at the bottom thereof.

18. The multi-stage float sorting device of claim 16, wherein the mass of the sodium hydrogen carbonate ($NaHCO_3$) injected into the first flotator is 5% of the mass of the ores.

* * * * *